United States Patent
Ament

[11] Patent Number: 5,829,567
[45] Date of Patent: Nov. 3, 1998

[54] CLUTCH DISC WITH ELASTIC MOUNTING

[75] Inventor: Norbert Ament, Eltingshausen, Germany

[73] Assignee: Fichtel & Sachs AG, Schweinfurt, Germany

[21] Appl. No.: 746,540

[22] Filed: Nov. 14, 1996

[30] Foreign Application Priority Data

Nov. 15, 1995 [DE] Germany ......................... 195 42 514.6

[51] Int. Cl.⁶ .............................. F16D 13/68; F16D 3/12; F16D 3/14

[52] U.S. Cl. ................... 192/70.17; 192/204; 192/213.2; 192/213.31

[58] Field of Search .................... 192/204, 213.2, 192/213.31, 70.17, 200, 213.12; 464/68

[56] References Cited

U.S. PATENT DOCUMENTS

| | | | |
|---|---|---|---|
| 2,720,958 | 10/1955 | Lysett | 192/70.17 |
| 5,000,304 | 3/1991 | Kock et al. | 464/68 |
| 5,582,280 | 12/1996 | Schneider et al. | 192/200 |
| 5,595,276 | 1/1997 | Memmel | 192/213.12 |

FOREIGN PATENT DOCUMENTS

| | | |
|---|---|---|
| 3248119 | 6/1984 | Germany . |
| 3340896 | 5/1985 | Germany . |
| 3532951 | 3/1987 | Germany . |
| 4341547 | 6/1994 | Germany . |
| 2060819 | 5/1981 | United Kingdom . |
| 2149476 | 6/1985 | United Kingdom . |
| 2295658 | 6/1996 | United Kingdom . |

*Primary Examiner*—Rodney H. Bonck
*Assistant Examiner*—Ankur Parekh
*Attorney, Agent, or Firm*—Nils H. Lijungman and Associates

[57] ABSTRACT

A clutch disc includes an elastic mounting to absorb both wobbling movement and to compensate for axially offsetting transmission components. Between the hub and the components which can rotate with respect to the hub, there is a spring element which makes it possible by means of two different types of fingers to accomplish both a radially elastic centering and an axially elastic clamping. The clutch disc can thereby absorb both wobbling movements and axial offsets.

17 Claims, 8 Drawing Sheets

FIG. 6
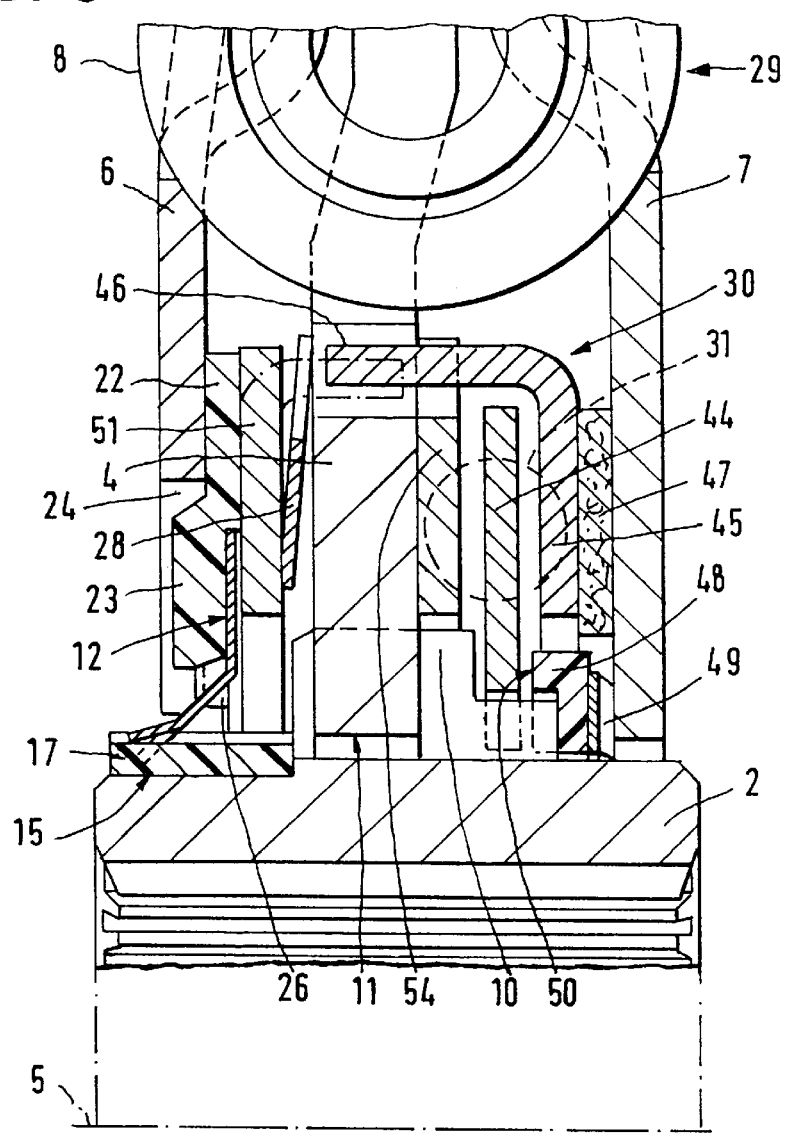
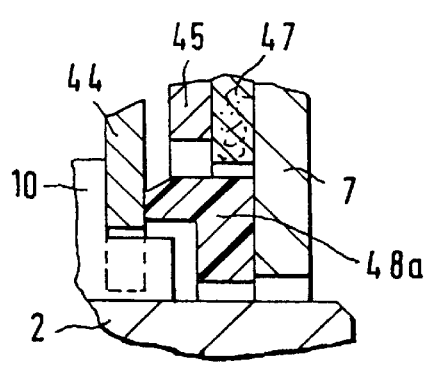
FIG. 6a
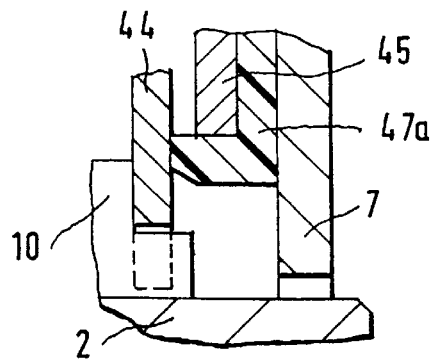
FIG. 6b

… (5,829,567)

CLUTCH DISC WITH ELASTIC MOUNTING

BACKGROUND OF THE INVENTION

1. Field of the Invention

The present invention generally relates to a clutch disc for a friction clutch of a motor vehicle. The clutch disc can include a hub with a hub disc for non-rotational fastening on a transmission shaft. Cover plates can be placed on both sides of the hub disc, the cover plates being non-detachably connected and held a distance from one another. One of the cover plates can carry friction linings. Spring elements can be located between the hub disc and the cover plates for the relative rotation of the hub disc and the cover plates when torque is applied to the clutch disc. A bearing or bearing point can be included between the hub disc and one of the cover plates to provide elasticity or resiliency between the cover plates and the hub disc.

2. Background Information

A known clutch disc is described in German Patent 33 40 896, in which a bearing element is located between an essentially cylindrical bearing seat of a hub and an essentially cylindrical guide of a cover plate. The bearing element is radially elastic and makes possible a mounting essentially without play or clearance between the cover plate and the hub. Compensation must also be provided for certain manufacturing tolerances, and a uniform friction must be essentially guaranteed. Such a solution is hardly capable, merely on the basis of the material elasticity of the bearing material or bearing element, to ensure elasticity, flexibility, or resilience between the hub and the components which rotate in relation to the hub. Such elasticity is necessary, for example, to compensate for axial offsets between the flywheel and the transmission shaft.

German Patent 32 48 119 describes another known clutch disc. Between the hub of the clutch disc and the components of the clutch disc which rotate in relation to the hub, there is an essentially conical bearing system which has a self-centering effect. The conical bearing system is held in constant mutual contact by means of a spring device. On such a clutch disc, it is of course possible to execute a certain pivoting movement between the input parts and the output parts of the clutch disc, and thus to make possible a certain wobbling movement. Any radial cushioning is problematic to the extent that the contours provided at that point for centering separate from one another; and the all-important centering is either lost, or must at least be re-established, when the clutch disc is taken out of operation. In addition, when there is a severe displacement between the centering areas, or relatively severe displacement between the centering areas, it is essentially impossible to prevent an increase in friction during the relative rotation of the components.

OBJECT OF THE INVENTION

The object of the present invention is to provide a clutch disc with a radial cushioning to compensate for axial offset and wobbling movement. Over the useful life of such a clutch disc, the clutch disc can therefore essentially remain fully able to perform its original function, whereby particular attention is paid to the friction devices which are required for damping vibrations.

SUMMARY OF THE INVENTION

The present invention teaches that this object can be accomplished by locating a spring element on a cover plate of the clutch disc. The spring element can be realized in the form of a ring-shaped disc, and can be oriented concentric to the axis of rotation. The spring element can include fingers which extend diagonally radially inward and point away from the hub disc, which fingers can be in direct contact under bias against an essentially cylindrical bearing area located concentric to the axis of rotation.

As a result of the configuration of the spring element and the correspondence between the spring element and the cover plate, it can be possible, preferably by means of the fingers, to keep the tolerance fluctuations of the cover plate with respect to the hub relatively small. The path of the fingers, which path is diagonally radially inward and points away from the hub disc, can also be advantageous in the operation of the clutch disc, since during the tipping movements and during the radial cushioning movements, essentially no axial forces are exerted on the cover plate by the fingers. It can thereby be essentially guaranteed that the friction devices located inside the clutch disc can be kept constant, or in other words, generate essentially a substantially constant friction force, essentially regardless of the spring movement.

The present invention also teaches that it can be advantageous that between the cylindrical bearing area of the hub and the fingers, there can be support elements which are preferably made of material which has a specified coefficient of friction. The specified coefficient of friction can be made larger or smaller depending on the particular embodiment of the present invention, and/or the specific needs of a particular clutch disc design. With the interposition of a material which has a specified coefficient of friction, it can be possible to keep the friction on the parts which move relative to one another substantially constant, and yet keep the friction relatively low—if desired in a particular embodiment—by a selection of a preferably plastic material. In a relatively substantial number of clutch disc applications or clutch disc embodiments, a low friction on the components in question can be advantageous, as component friction can occur even during the damping of idle vibrations, and there can be low spring constants in this range of operation.

The present invention also teaches that the support elements can be realized in the form of individual blocks, each of which can be essentially radially pressurized by a finger. The individual blocks can be guided in recesses of the corresponding cover plate. The configuration of the support elements in the form of individual blocks can be advantageous to the extent that the diameter tolerances on the hub have practically no influence on the bias of the fingers. The diagonal fingers can preferably be provided with very flat spring characteristics in the range of small spring movements, and it is therefore practically impossible for them to react undesirably to diameter tolerances of the hub.

It is also possible, in another possible embodiment of the present invention, to provide the support element in the form of a ring. The ring can be rotationally located on the hub, and on which ring the fingers of the spring element can be supported. Such an embodiment can have the advantage of a relatively small number of individual parts, as well as easier assembly and installation.

It can also be advantageous, in another possible embodiment of the present invention, to provide the ring on its external contour with recesses which preferably run axially. In the recesses, the fingers can be non-rotationally engaged. It is thereby essentially guaranteed that the relative movement occurs not between the spring element and the ring, but between the ring and the hub. The clearly defined location of the relative movement can essentially ensure that the frictional engagement occurs essentially immediately, or relatively quickly, and can essentially ensure the frictional engagement occurs namely at the specified or predetermined location. Furthermore, wear between the fingers of the spring element and the plastic ring can at least be reduced to a relative minimum.

The present invention also teaches that the ring, peripherally offset from the recesses, can have slots which are open and pointing away from the hub disc. The slots can have a terminal contour which runs diagonally, ascending toward the hub disc. On the terminal contour, additional fingers of the spring element can be supported, thereby preferably generating or creating an axial force component, and/or an axial retaining force component. This embodiment or configuration of the ring and of the spring element can make it possible to realize a single axial securing component for the ring. It can also be possible to use the axial force component so that the components of the clutch disc which are rotational in relation to the hub assume a specified centered position in the axial direction.

The present invention teaches that the spring element can be non-rotationally connected to the corresponding cover plate with the interposition of a preferably plastic ring. The plastic ring can be non-rotationally engaged from the side of the hub disc, preferably by means of axially directed lugs in a recess which is open toward the radial inside on the cover plate. The cover plate can be inserted, by means of an annular disc shaped area, into a corresponding depression in the plastic ring from the hub disc side. The fingers of the spring element can also run through recesses in the plastic ring, which recesses are preferably open toward the radial inside. The plastic ring, as a component which is relatively easy to manufacture, can thus preferably create the non-rotational connection and establish the correct relative position between the cover plate and the spring element.

It is also altogether conceivable, as an alternative embodiment of the present invention, that both parts (i.e. the spring element and the plastic ring) can be manufactured as a compound part, by preferably surrounding the spring element with the material of the plastic ring.

The plastic ring can thereby preferably perform a dual function, or in other words, the plastic ring can perform an additional function in addition to connecting the spring element to the cover plate. The plastic ring can be clamped, in its radially outer area between the inside of the cover plate and the hub disc, to generate a friction force when there is a relative movement between the cover plate and the hub disc. It is relatively easy to coordinate or specify the friction force by the selection of the material used for specific embodiments.

The present invention also teaches that preferably on the side of the hub disc opposite, or facing, the plastic ring there can be a spring which applies pressure to the plastic ring in the direction of the hub disc. This spring can include, for example, the corresponding cover plate being installed with an axial bias. It is also possible, however, under certain conditions, to locate the spring on the side of the plastic ring, as described in greater detail below.

In a clutch disc construction or embodiment with a separate idle spring device with a preferably relatively flat spring characteristic, the hub and the hub disc can be designed in two parts, with a non-rotational gearing with clearance in the peripheral direction. The present invention teaches that the idle spring device can include a hub disc which can be engaged non-rotationally, and essentially without peripheral play, in the axially elongated outer gearing of the hub. The idle spring device can also include a cover plate which is located between the hub disc and the plastic ring. The cover plate can be non-rotationally connected to the hub disc by means of tabs which are preferably bent axially on the outside diameter and are axially supported on it. The cover plate and plastic ring can be held in frictional contact by a load friction device between the hub disc and the cover plate at some distance from the idle spring device. The idle spring device can contain at least one load spring which preferably acts axially.

For such applications or embodiments in which a separate idle spring device is necessary or desirable to damp the transmission noises at idle, the present invention teaches that the idle spring device can be located on the side of the hub disc on which the plastic ring and the spring element can also be located, on the side facing the load friction device with an axially acting load spring. Thus, the plastic ring can be in direct contact with the cover plate of the idle spring device, and can generate a load friction at that point when there is an angular deviation which is greater than the range of action of the idle spring device.

On the side of the hub disc farther from the idle spring device, the present invention teaches that radially inside the load friction device there can be an additional friction device which can include a friction ring which is in axial contact against the gearing of the hub and, if necessary, can be non-rotationally connected with the gearing, as well as a spring between the friction ring and the cover plate. This additional friction device, with its spring in connection with the spring element on the opposite side, can essentially ensure an axial centering with respect to the hub of all of the components which are rotational in relation to the hub. It can thereby be ensured, for example, that in the event of large wobbling movements between the hub and the friction linings in the clutch disc, there will be essentially no undesirable friction caused by unintentional contact between components.

The present invention also teaches that the hub disc of the idle spring device can be located axially loosely in the external gearing. In one possible embodiment of the present invention, the hub disc of the idle spring device can be located axially loosely between a shoulder of the gearing and a contact contour of the plastic ring which preferably projects radially inside the cover plate of the idle spring device toward the hub disc. As a result of the axial centering of the hub with respect to the two cover plates and as a result of the contact contour of the plastic ring, the axial clearance required for the hub disc of the idle spring device can essentially be exactly specified. Therefore essentially no undesirable contacts between this hub disc and the surrounding components can occur, even if large wobbling movements of the clutch disc must be absorbed. At the same time, the non-rotational connection between the hub disc of the idle spring device and the hub can essentially be guaranteed, whereby the manufacturing and installation processes can be kept relatively simple.

The present invention also teaches that the axial force components of the spring element and of the spring of the friction device can be coordinated so that an axial gap is preferably maintained between the cover plate and the friction ring or spring under substantially all operating conditions. Consequently, the mobility of essentially all of the components can be guaranteed with respect to the hub, in particular with regard to wobbling movements, whereby even relatively large deviations essentially do not result in any undesirable material contact or an increase in friction losses.

The present invention also teaches that the space radially outside the plastic ring can be advantageously used by providing the spring element, over the radial extension of the cover plate of the idle spring device, starting from an area near the hub, with the plastic ring and an additional friction device. The additional friction device can preferably include a friction ring which is in contact against the inner wall of the cover plate, with axially projecting lugs which can be attached on the radial outside and can be engaged with clearance in openings in the hub disc of the idle spring device, and a friction spring is located between the friction ring and the cover plate radially inside the lugs. This additional friction device can be located in a space-saving manner radially inside the load springs, and can be used substantially independently of all the other components by means of an appropriate selection of the openings in the hub disc. It is thereby possible to use this friction device even in the range of action of the idle spring device.

According to an additional characteristic of the present invention, it can also be possible to locate the idle spring device on the side of the hub disc opposite the spring element or the plastic ring. In such a case or embodiment of the present invention, the present invention teaches that the idle spring device can include a hub disc which is non-rotationally engaged essentially without peripheral play in the axially extended outer gearing of the hub. The idle spring device can also include a cover plate which is located between the hub disc and the cover plate of the idle spring device. The idle spring device can also be provided on the outside diameter with lugs which project axially toward the hub disc, which lugs can be non-rotationally engaged in the hub disc and can be axially supported on it. Between the cover plate of the idle spring device and the cover plate of the load spring device, there can be a load friction ring, and an axially acting load spring can be located between the hub disc and the plastic ring. Such a construction or possible embodiment of the present invention can be used to advantage, for example, if there is more room available for installation on the side opposite the spring element.

The present invention also teaches that radially inside the load friction ring there can be an additional friction device which can include a friction ring which is in contact axially against the external gearing of the hub, and, if necessary, is non-rotationally connected to the external gearing. The additional friction device can further include a spring between the friction ring and the cover plate. The additional friction device at this point can make possible, in interactions with the spring element on the opposite side, the axial correspondence between the hub and the other components of the clutch disc. Therefore when tipping movements occur, there can be sufficient clearance for movement without substantial increase of the friction forces.

With regard to a simplification of the assembly process, the present invention teaches that the hub disc of the idle spring device can be located axially loosely in the external gearing. In a possible embodiment of the present invention, the hub disc of the idle spring device can be located axially loosely between a shoulder of the external gearing and a contact or stop contour of the friction ring. The axial play of the hub disc can thereby be defined or limited, and in connection with the two axial springs which can preferably essentially axially fix the hub in position with respect to the other components of the clutch disc, this hub disc can be given a substantially self-adjusting capability. For the relatively extreme case of a lateral contact against the contact contour of the friction ring, essentially no additional friction will occur at that point, if, in accordance with a possible embodiment of the present invention, the friction ring is engaged relatively firmly with the external gearing of the hub.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below on the basis of the embodiments illustrated in the accompanying drawings, wherein:

FIG. 4b is a cross section similar to FIG. 4a, but including a partial cross section of the spring element illustrated in FIG. 2 and FIG. 2a;

FIG. 6 is a longitudinal section through the upper half of a clutch disc with an idle spring device on the transmission side;

FIG. 6a is a detail of a portion of the upper half of the clutch disc with an idle spring device on the transmission side illustrated in FIG. 6;

FIG. 6b is a detail of another portion of the upper half of the clutch disc with an idle spring device on the transmission side illustrated in;

DESCRIPTION OF THE PREFERRED EMBODIMENT

Figure 1:
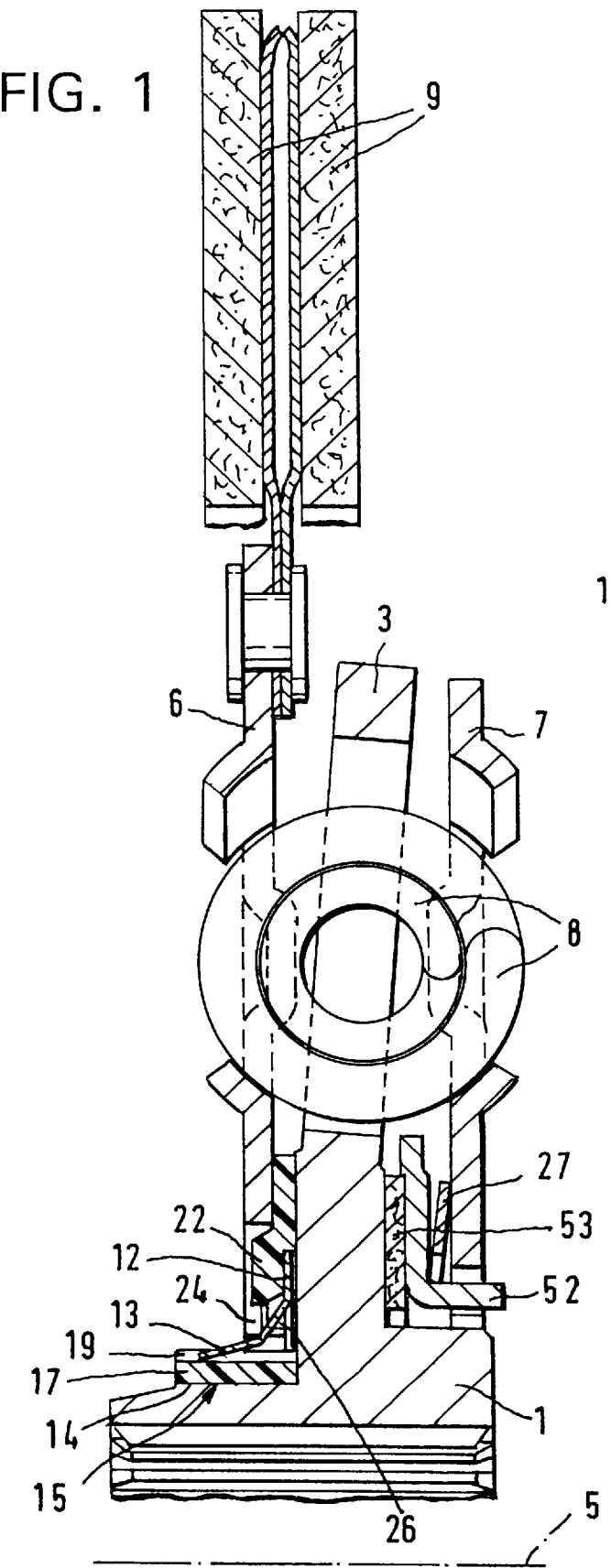
FIG. 1 is a longitudinal section through the upper half of a clutch disc without an idle spring device.
Figure 7A:
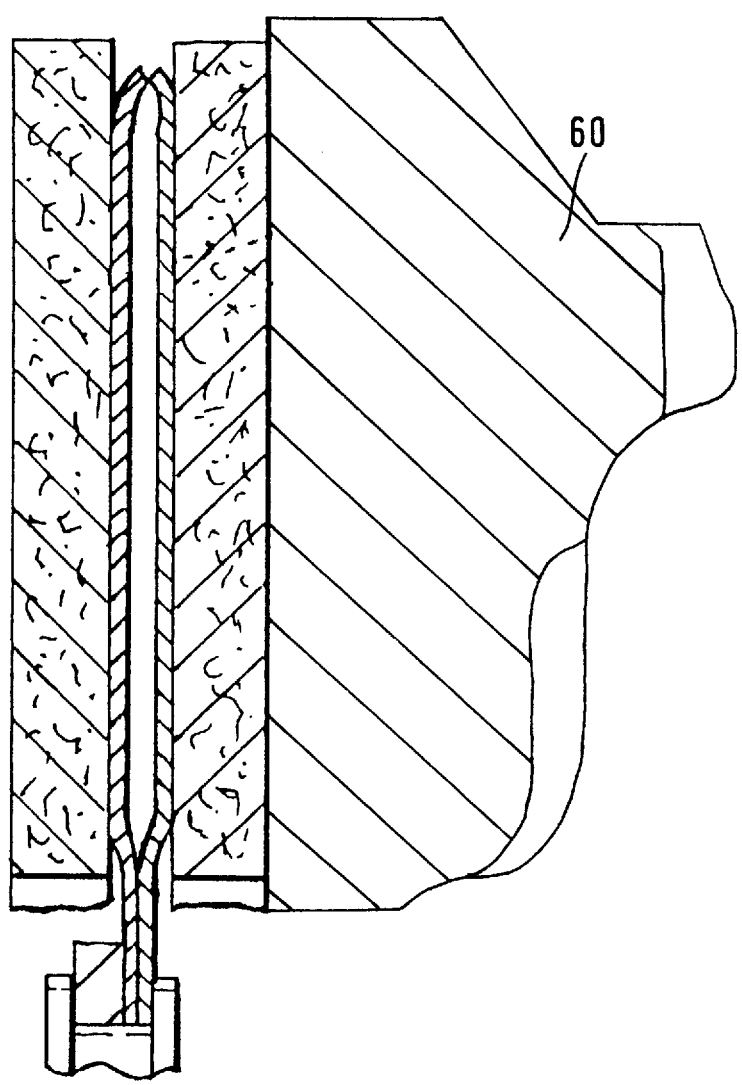
FIG. 7a is a longitudinal section through a portion of the upper half of a clutch disc, and a clutch pressure plate.

FIG. 1 is a longitudinal section through the upper half of a clutch disc with a hub 1 which is non-rotationally mounted on a transmission shaft (not shown) and an axis of rotation 5. The hub 1 can be realized in one piece with a hub disc 3 which extends radially outward. On both sides of the hub disc 3 there can be cover plates 6 and 7, which cover plates 6 and 7 are non-rotationally connected to one another and are held at a distance from one another, and whereby one of the cover plates 6 and 7 can be provided in its radially outer area with friction linings 9. The clutch disc shown in FIG. 1 is preferably for a motor vehicle clutch, which motor vehicle clutch could include a pressure plate 60 (see FIG 7a) to engage with a flywheel of a motor vehicle, biasing means for the pressure plate, a clutch housing, and other motor vehicle clutch components not shown in FIG. 1.

In corresponding apertures of the hub disc 3 and cover plates 6 and 7, there can be coil springs 8 which, when torque is applied from an engine, make possible a relative movement between the cover plates 6 and 7 and the hub disc 3. The relative movement between the cover plates 6 and 7 and the hub disc 3 takes place essentially concentric to the axis of rotation 5.

Between the two cover plates 6 and 7 on the one hand and the hub 3 on the other hand, there can be a friction device to damp torsional vibrations. This friction device can include a support ring 52, which support ring 52 can be engaged by means of axially projecting lugs in corresponding openings of the cover plate 7, so that the support ring 52 can be axially movable but has essentially no play in the peripheral direction. The support ring 52 can be preferably spring-loaded or biased by means of a spring 27 away from the cover plate 7. Between the support ring 52 and the hub disc 3 there can be a friction ring 53. The friction ring 53, as a result of the material forming friction ring 53 and the force of the tension of the spring 27, can generate a corresponding friction force. To support the two cover plates 6 and 7 against the force of the spring 27, between the cover plate 6 and the hub disc 3 there can be an additional ring 22, wherein the ring 22 is preferably made of plastic. The friction force generated by the plastic ring 22 can also contribute to the torsion damping.

This plastic ring 22 can also have an additional function. The plastic ring 22 can guide a spring element 12. The spring element 12 can include fingers 13, which fingers 13 extend diagonally radially inward and point away from the hub disc 3. The fingers 13 can be in contact under bias concentric to the axis of rotation 5 against a cylindrical bearing area 15 of the hub 1. This system can be capable of compensating for axial offsets between the transmission shaft and the crankshaft of the internal combustion engine, whereby a radial displacement between the hub 1 and the cover plates 6, 7 can be possible in the radial direction. There is not thereby any substantially adverse effect on the function of the clutch disc.

The spring element 12 can also make it possible to compensate for a wobbling movement between the transmission shaft and the crankshaft of the internal combustion engine. Against the force of the fingers 13, the friction linings 9 can be displaced with the cover plates 6 and 7 with respect to the hub 1 or the hub disc 3 so that the radially outer areas of the friction linings 9 can be displaced by a certain amount in both directions of the axis of rotation 5. For this purpose, the two cover plates 6 and 7 can be at a sufficient radial distance from the corresponding areas of the hub 1 in their radially inner area.

FIGS. 2, 2a, 3, 3a, 4, 4a and 4b illustrate details of possible embodiments of the plastic ring 22, the spring element 12 and a ring 17. As shown in FIG. 1, the ring 17 can be located in the essentially cylindrical bearing area 15 of the hub 1, and the fingers 13 can be in flexible contact with this essentially cylindrical bearing area 15 of the hub 1.

Figures 2, 2A:
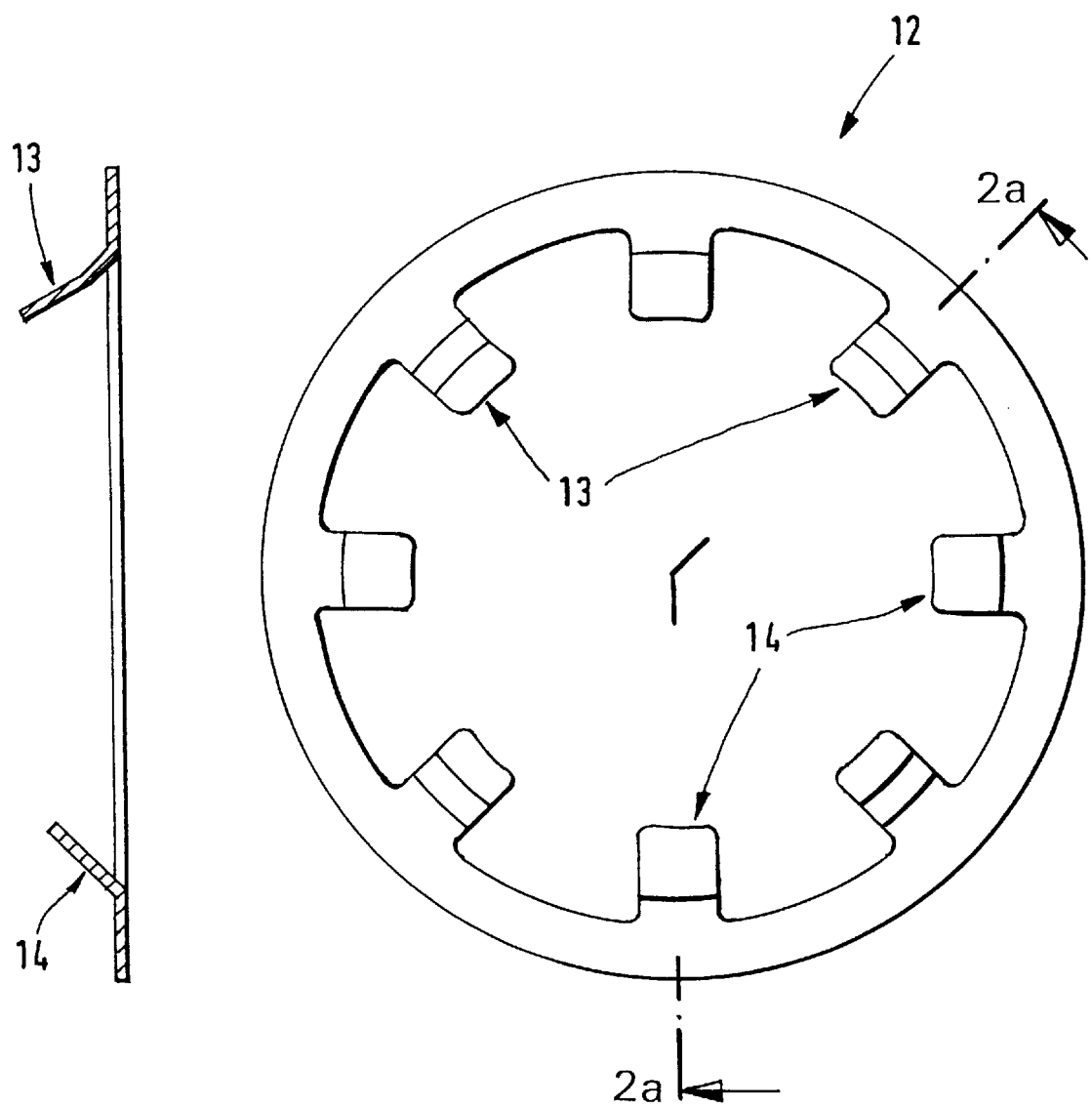
FIG. 2 is a plan view of a spring element.
FIG. 2a is a sectional view 2a—2a of the spring element illustrated in FIG. 2.

FIG. 2 shows a plan view, and FIG. 2a shows a cross section 2a—2a of FIG. 2, of the spring element 12. The spring element 12 can include a closed body which is preferably in the form of a ring-shaped disc, from which ring-shaped disc two different types of fingers, fingers 13 and fingers 14 (shown as hidden lines in FIG. 1), can extend toward the radial inside. The fingers 13 are bent relatively sharply out of the plane of the ring-shaped base body. As shown in FIG. 1, the fingers 13 can be in radially flexible contact with the external contour of the ring 17. This ring 17 can be made of a friction material or of a plastic material which preferably has a low coefficient of friction. The ring 17 can be guided on an essentially cylindrical bearing area 15 of the hub 1, which runs concentric to the axis of rotation 5.

Figure 4:
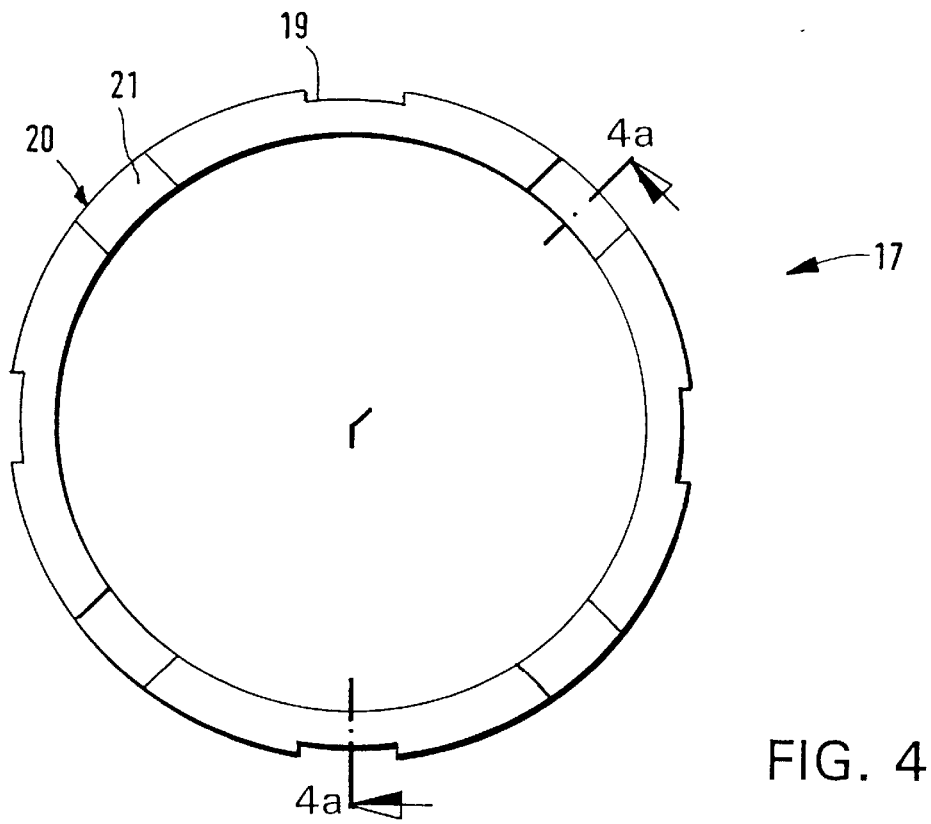
FIG. 4 is a plan view of a ring.
Figure 4A:
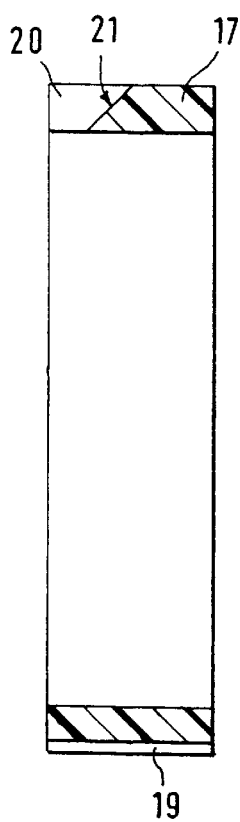
FIG. 4a is a cross section 4a—3a of the ring illustrated in FIG. 4.

To clearly define the friction point, the embodiments of the ring 17 illustrated in FIGS. 4 and 4a can be provided in the vicinity of the outside periphery of the ring 17 with recesses 19. The recesses 19 can run axially and can be open toward the radial outside. These recesses 19 can correspond to the width of the fingers 13, so that the spring element 12 and the ring 17 can be held non-rotationally in relation to one another, as shown in FIG. 1. When torque is applied to the clutch disc 3, there can therefore be a relative movement in the bearing area 15 between the ring 17 and the hub 1. The bearing area 15 can be characterized by contact over a relatively large surface area, which means that there can be relatively little wear at this point, and the friction force which occurs here can be specified within relatively narrow limits.

As shown in FIGS. 2 and 2a, peripherally offset on the spring element 12 there can be the second type of finger 14, whereby these fingers 14 have a reduced angular bending out of the plane of the base body of the spring element 12. These fingers 14 are shown together with the slots 20 of the ring 17 in section view in FIG. 4b.

Figure 4B:
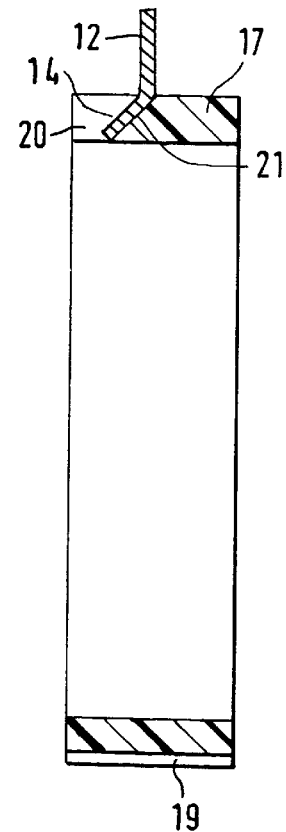

In accordance with one embodiment of the present invention shown in FIG. 4b, the ring 17 can be open in the axial direction and can have a terminal contour 21 which runs conically, and in particular the terminal contour 21 can essentially correspond to the angular bending of the fingers 14. In the embodiment illustrated in a sectional view in FIG. 4b, the fingers 14, together with the terminal contour 21 of the ring 17, are intended to hold the ring 17 in position, so that the ring 17 essentially cannot wander away from the bearing area 15. It should be recognized that the embodiment shown in the sectional view FIG. 4b illustrates one finger 14 of preferably a plurality of fingers 14 that engage the slots 20 and the terminal contours 21 of the ring 17.

Figure 3A:
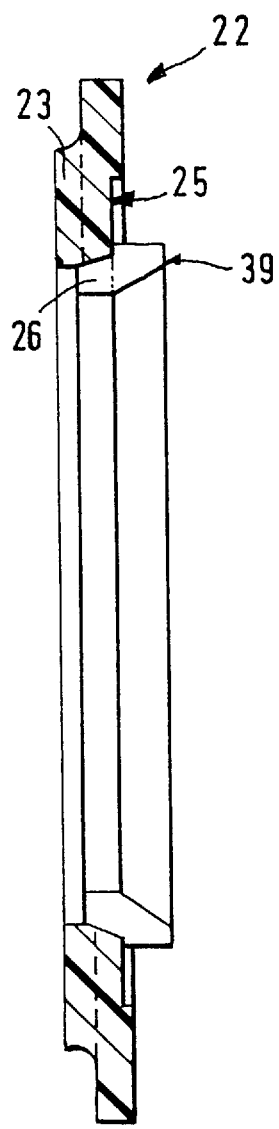
FIG. 3a is a cross section 3a—3a of the plastic ring illustrated in FIG. 3.
Figure 3:
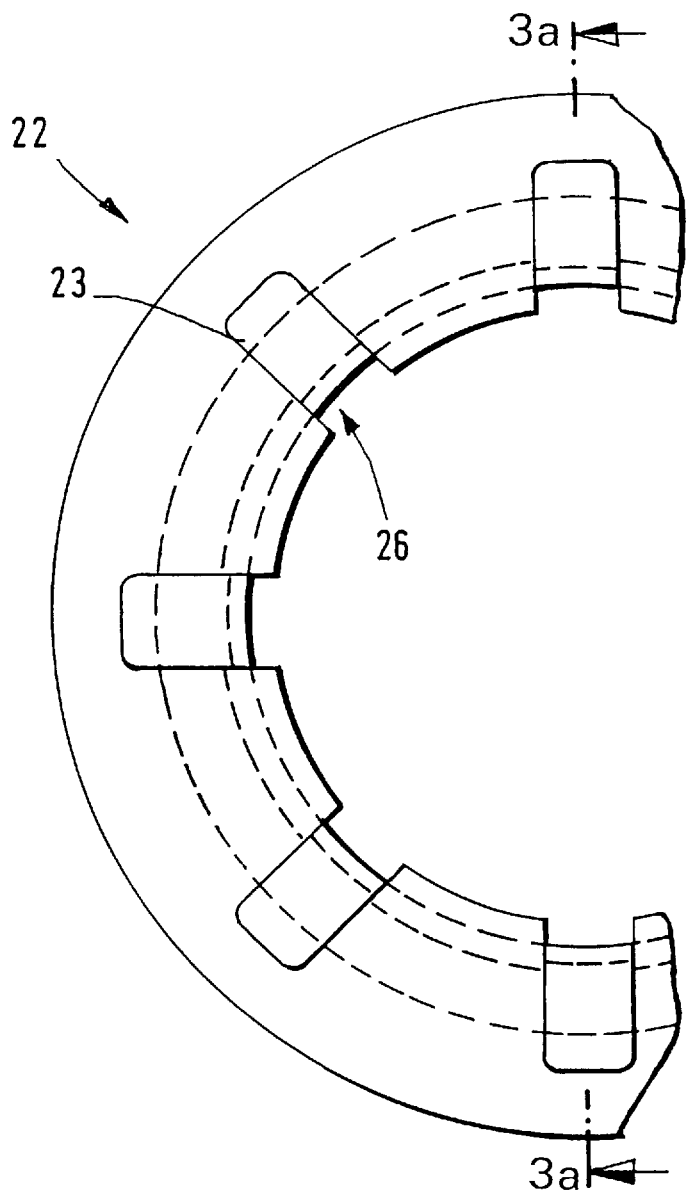
FIG. 3 is a plan view of a plastic ring.

FIGS. 3 and 3a illustrate an embodiment of the ring 22. As shown in FIG. 1, the spring element 12 can be fastened to the cover plate 6 by means of the ring 22. The ring 22 can be preferably made of plastic. The plastic ring 22, on the side facing the inside of the cover plate 6, can have axially projecting lugs 23 which can be non-rotationally engaged in corresponding recesses 24 (shown in FIG. 1) in the cover plate 6. These recesses 24 can be open toward the radial inside. The plastic ring 22, on the side farther away from the lugs 23, can have a concentric depression 25 in which the spring element 12, with its ring-shaped base body, can be inserted. For the fingers 13 and 14 of the spring element 12, there can be recesses 26 (also shown in FIG. 1) in the plastic ring 22, which recesses 26 can be open toward the radial inside. The recesses 26 can correspond to the recesses 24 of the cover plate 6. The passage of the fingers 13 and 14 through the plastic ring 22 and the cover plate 6 in the axial direction away from the hub disc 3 can thereby be essentially guaranteed. At substantially the same time, a non-rotational connection between the plastic ring 22 and the spring element 12 can essentially be guaranteed by the fact that the fingers 13 and 14 can be located in the recesses 26 essentially without play in the peripheral direction. The plastic ring 22 can also have a bead or reinforcement with a contact contour 39 in the vicinity of the recesses 26, still pointing away from the lugs 23, which bead is explained in greater detail below with reference to another embodiment.

Figure 1A:
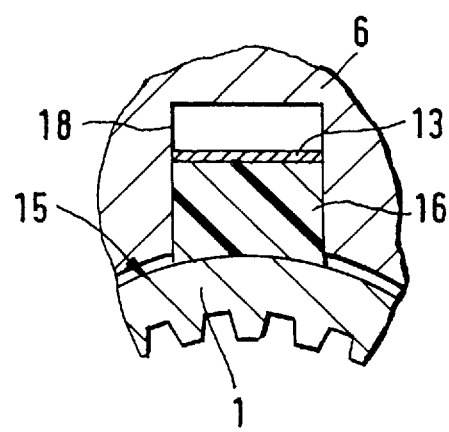
FIG. 1a is a detail of a portion of FIG. 1.

The radial centering and the radial displacement capability between the hub 1 and the cover plates 6 and 7 with the friction linings 9 and the relative rotational capability can essentially be guaranteed by the spring elements 12. In an additional variant illustrated in separate detail in Figure 1a, it can also be possible to replace the ring 17 with individual blocks 16 which can be guided in the radial direction in corresponding recesses 18 of the cover plate 6. Pressure can be applied to the individual blocks 16 by the individual fingers 13 of the spring element 12 in the radial direction. The individual blocks 16 can thereby be preferably in contact with a corresponding contour on the bearing area 15 of the hub 1. This construction, in terms of function, is essentially identical to the construction described above in connection with the ring 17.

Figure 5:
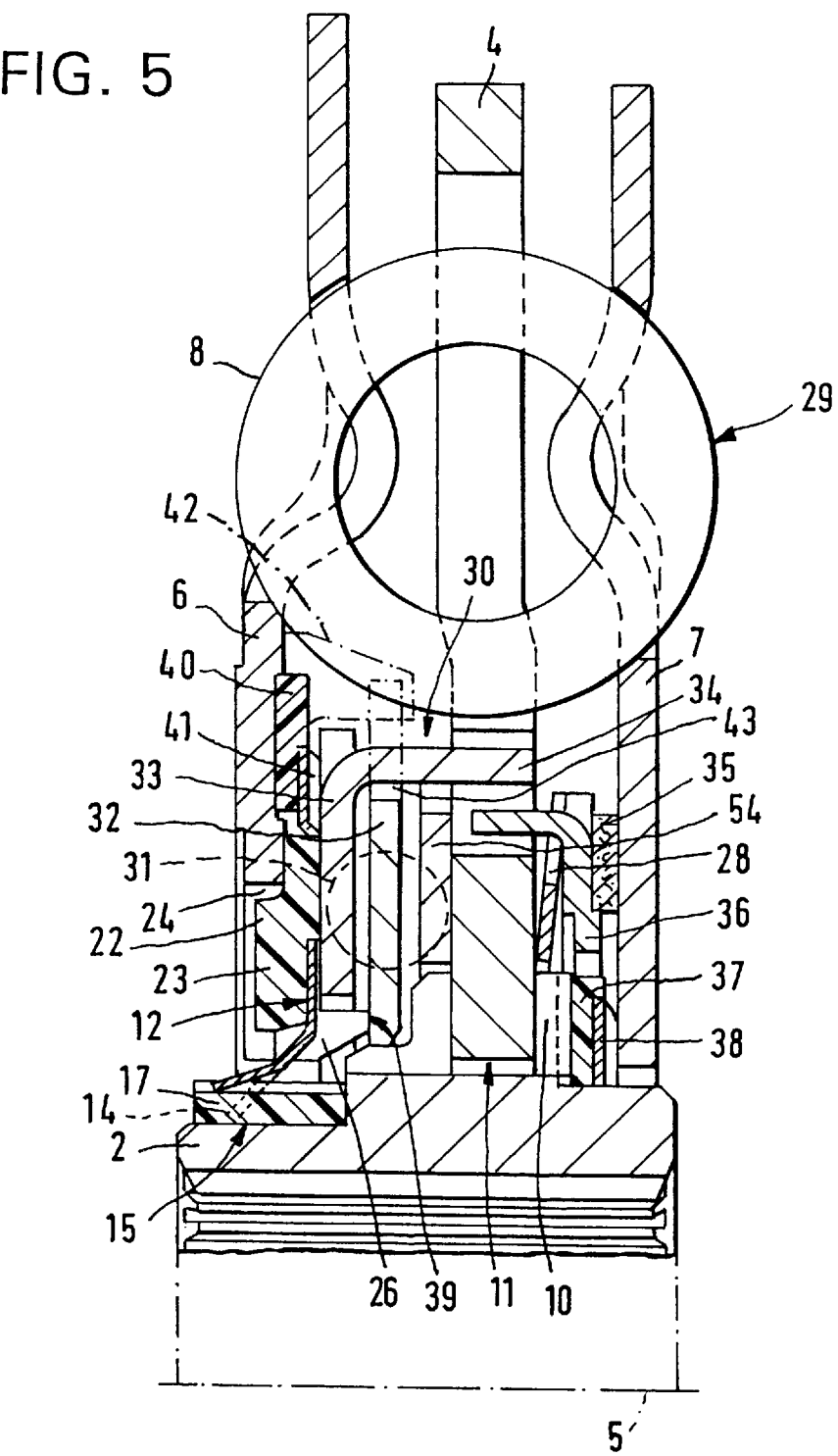
FIG. 5 is a longitudinal section through the upper half of a clutch disc with an idle spring device on the engine side.

FIG. 5 shows a longitudinal section through the upper half of a clutch disc, in which clutch disc there can be preferably both a load spring device and an idle spring device. A hub 2 can be oriented concentric to the axis of rotation 5. The hub 2 can have a hub disc 4. The hub 2 and the hub disc 4 can be non-rotationally connected to one another. By means of an external gearing 10 on the hub 2, and an internal gearing 11 on the hub disc 4, the hub 2 and the hub disc 4 can have play in the peripheral direction corresponding to a range of action of an idle spring device 30. The hub 2 with the external gearing 10 can be engaged with the hub disc 4 by means of the internal gearing 11, whereby peripherally, there can be the above-mentioned play. On both sides of the hub disc 4 there can be cover plates 6 and 7 which can be non-rotationally connected to one another and can be held at a distance from one another.

In a known manner, there can be springs 8 located between the cover plates 6 and 7 and the hub disc 4. The springs 8 can preferably be located in corresponding openings of the cover plates 6 and 7 and the hub disc 4. The springs 8 preferably represent a load spring device 29. This load spring device 29 can make it possible, when torque is applied to the clutch disc, to have relatively greater spring deflections with respect to the hub 2. Between the hub disc 4 and the one cover plate 6 there can be the complete idle spring device 30, as well as the ring 22 with the spring element 12. The ring 22 for the embodiment shown in FIG. 5, can preferably be made of plastic. The plastic ring 22—as described above—can be non-rotationally connected to the cover plate 6, and can guide the spring element 12 between the recesses 25 (shown in FIG. 3a) and a cover plate 33 of the idle spring device 30, which cover plate 33 can be in direct contact against the plastic ring 22.

The cover plate 33, in its radially outer area, can have tabs 34 which are bent preferably at substantially right angles toward the hub disc 4. The tabs 34 can be engaged for the non-rotational connection with the hub disc 4, with essentially no play in the peripheral direction in corresponding openings of the hub disc 4. Also, the tabs 34 can be axially supported by corresponding edges on the outside of the hub disc 4. As a result of this arrangement, between the cover plate 33 and the hub disc 4, a space can be left free in which a hub disc 32 of the idle spring device 30 can extend. This hub disc 32 can be non-rotationally inserted essentially without play in the peripheral direction into the external gearing 10 of the hub 2. The external gearing 10 in this area can have a preferably reduced outside diameter. Between the hub disc 32 and the hub disc 4, there can be an additional cover plate 54 for the idle spring device 30, whereby there can be a non-rotational connection between the two cover plates 33 and 54.

The function of the cover plate 54, however, can, essentially without any additional measures, be driven along with the hub disc 4. In such an embodiment, there can be recesses in the hub disc 4, which recesses can be used to actuate the coil springs 31 (the coil springs 31 are shown in broken lines in FIG. 5). In addition, there can be corresponding apertures in both cover plates 33 and 54 and in the hub disc 32, in which corresponding apertures the coil springs 31 can be inserted. On the side of the hub disc 4 opposite the idle spring device 30, there can be a load spring device which includes a friction ring 35, a support ring 36 and a load spring 28. The support ring 36 can be non-rotationally engaged by means of axially bent lugs with the hub disc 4. The support ring 36 can be supported by means of the friction ring 35 on the inside of the cover plate 7, and pressure can be applied to the support ring 36 by the load spring 28. The load spring 28 can be axially supported on the hub disc 4.

The force exerted by the load spring 28 can be transmitted by the support ring 36 to the friction ring 35. From the friction ring 35 the force can be transmitted via the cover plate 7 to the cover plate 6, and from the cover plate 6 and the plastic ring 22 to the cover plate 33 of the idle spring device 30. From the cover plate 33 the force in turn can be transmitted to the hub disc 4. The circuit can thereby be closed. A base friction device can be located radially farther inside the load friction device described above. The base friction device can include a friction ring 37 and a spring 38. Both parts, i.e. friction ring 37 and spring 38, can be located axially between the radially inner area of the hub disc 4 and the end surface of the external gearing 10 of the hub 2.

The spring 38, in connection with the fingers 14 (shown as dashed lines in FIG. 5) of the spring element 12, can essentially ensure an axial correspondence between the hub 2 and the two cover plates 6 and 7, whereby the axial play of the hub disc 32 of the idle spring device 30 can be defined. The hub disc 32 can preferably be inserted axially loosely in the external gearing 10 of the hub 2. The freedom of movement of the hub disc 32 can be important to achieve the relatively lowest level of friction during the relative rotation of the components inside the clutch disc, even in the event of wobbling movements and radial displacement. The hub disc 32 can thereby move substantially freely in the axial direction between the shoulder or end surface in the external gearing 10 and the contact contour 39 (also shown in FIG. 3a) of the plastic ring 22.

Radially outside the plastic ring 22 there can be an additional friction device. The additional friction device can include a friction ring 40, which friction ring 40 can be in contact against the inside of the cover plate 6. The friction ring 40 can thereby be guided radially, and to which friction ring 40 pressure can be applied by a spring 41 which can be supported on the cover plate 33. The friction ring 40 can be provided with axially bent lugs 42 (shown in broken lines), which can preferably engage openings 43 of the hub disc 32, which openings 43 are preferably larger in the peripheral direction. The actuation of the friction ring 40 after a specified idle angle can therefore be selected in essentially a completely independent manner. The basic function of the ring 17 on the bearing area 15 of the hub 2 has been described above in connection with FIG. 1, as has the non-rotational connection of the spring element 12 by means of the recess 26 with respect to the plastic ring 22.

The general function of the clutch disc is then as follows: When torque is applied in the idle range of an internal combustion engine and the transmission (not shown), the cover plates 6 and 7 and the hub disc 4 can be considered non-rotational components on account of the relatively high rigidity of the springs 8, and the force of the friction clamping of the components 22, 33, 28, 36 and 35. At these relatively small deflections, preferably within the play of the gearings 10 and 11, preferably only the coil springs 31 of the idle spring device 30 can be pressurized, as well as the base friction devices (which are represented by the friction ring 37 and the ring 17), in connection with the axial force components of the fingers 14 of the spring element 12 and the bias of the spring 38.

Under load conditions, when generally greater torques can be applied, the idle spring device 30 can be bridged, because the gearings 10, 11 are preferably in contact with one another in the load direction. A relative rotation preferably takes place only between the two cover plates 6 and 7 and the hub disc 4 with the cover plate 33. In this case, in addition to the base friction, the load friction can also be effective, which load friction can be determined by the force of the load spring 28 and by the friction ring 35 or the plastic ring 22. The additional friction device which includes the components 40 and 41 can be actuated essentially at any time, preferably as a function of the idle angle. The substantially purely radial offsets of transmission shaft and crankshaft of an internal combustion engine which can occur during operation can be absorbed by the fingers 13 of the spring element 12. Thereby at least the cover plates 6 and 7, with the friction linings 9, can move eccentrically by a certain amount in the radial direction with respect to the hub 2, without substantially interfering with the function of the clutch disc.

In the event of wobbling movements, a guidance and centering action in the axial direction can preferably be maintained by means of the spring 38 on the one side of the external gearing 10 and by means of the fingers 14 of the spring element 12, which centering and guidance action can be coordinated by the spring characteristics, or the spring force characteristics of the spring 38 and/or the fingers 14 and/or other components as desired. In applications in which relatively larger wobbling movements occur, it can thereby be advantageous, in embodiments of the present invention, if a sufficient gap is provided between the cover plate 7 and the friction ring 37 or the spring 38. In applications where there is only a relatively small wobbling movement, or substantially none at all, it can also be possible, in embodiments of the present invention, to omit the spring 38 and instead provide contact between the cover plate 7 and the friction ring 37. The contact between the cover plate 7 and the friction ring 37 can preferably be maintained by the bias of the fingers 14 of the spring element 12. The fingers 14 can thereby be supported by means of the terminal contour 21 of the ring 17 and a corresponding shoulder on the hub 2.

Figure 7B:
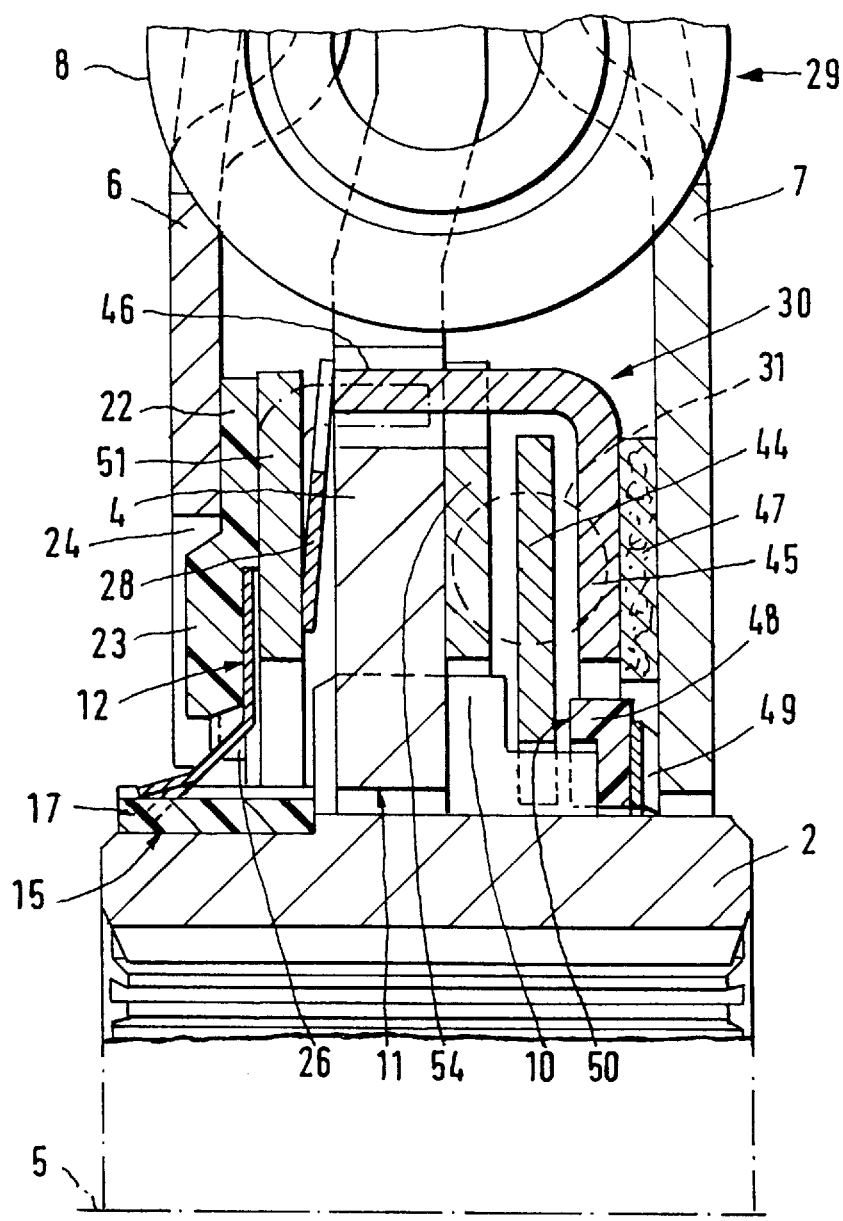
FIG. 7b is similar to FIG. 6, showing a longitudinal section through the upper half of a clutch disc with an idle spring device on the transmission side.

FIG. 6 illustrates a variant of FIG. 5, in which the idle spring device 30 can be located on the side of the hub disc 4 opposite the plastic ring 22 and the spring element 12. The construction of idle spring device 30 can be practically identical to the one illustrated in FIG. 5. As illustrated in FIG. 6, a cover plate 45 can be non-rotationally engaged by means of axially bent lugs 46 in the hub disc 4, and the cover plate 45 can also be supported axially on the hub disc 4 by means of corresponding contact edges (see FIG. 7b). Between the cover plate 45 and the cover plate 7 of the load spring device 29, there can be a load friction ring 47 which is pressurized from the opposite side. The ring 22, which ring 22 can preferably be made of plastic, can be in contact against the inside of the cover plate 6, and the plastic ring 22 can be non-rotationally connected to the cover plate 6 by means of lugs 23 preferably engaging recesses 24.

Adjacent to the plastic ring 22 can be a support ring 51. The support ring 51 can be realized with its base body in the form of a disc. The support ring 51 can be provided in the vicinity of its outside diameter with axially bent lugs which are shown in broken lines and which can be non-rotationally engaged in corresponding openings of the hub disc 4. Between the support ring 51 and the hub disc 4 there can also be the load spring 28 which can provide the friction force for the load spring device 29. In this construction, too, the hub disc 44 of the idle spring device 30 can be axially loosely inserted, but without substantial play in the peripheral direction, in a reduced-diameter external gearing 10 of the hub 2. The axial room for movement of the hub disc 44 can be specified or limited by a shoulder in the external gearing 10 and by a friction ring 48 which can be in contact with the end surface of the external gearing 10 as viewed from the cover plate 7.

The friction ring 48 can thereby be non-rotationally connected to the external gearing 10 by means of axially projecting gearing areas. The friction ring 48 can have a contact contour 50 which preferably limits the hub disc 44 in its freedom of movement toward the cover plate 7. The friction ring 48 can thereby be held in contact against the external gearing 10 by means of a spring 49. The spring 49 can act against the axial force component of the fingers 14 of the spring element 12, and the two springs, the spring 49 and the spring element 12, can be coordinated so that the two cover plates 6 and 7, with the hub disc 4 and the cover plate 45 of the idle spring device 30, together with the corresponding friction elements, are oriented so that the hub disc 44 of the idle spring device 30 can have room for movement between the contact contour 50 and the external gearing 10. However, in the embodiment shown, the hub disc 44 essentially cannot come into contact with the cover plates 45 and 54, even if a diagonal position can occur as a result of imposed wobbling movements.

In addition to the cross section through the clutch disc, FIGS. 6a and 6b show details of two variant embodiments of the present invention. Both variant embodiments can have the axially clamped hub disc 44 for the idle spring device 30, so that in the embodiments shown in FIGS. 6a and 6b there can be essentially a fixed correspondence between the hub disc 44 and the hub 2. The axially clamped hub disc 44 can also preferably permit the hub disc 44 to be firmly hammered or caulked into in the external gearing 10, whereby under some conditions, with clutch discs with relatively high loads in the idle range, a better mutual contact can be achieved. As shown in FIG. 6a, the cover plate 7 can be axially fixed with respect to the hub 2 by means of a friction ring 48a. The friction ring 48a can be supported directly on the inside of the cover plate 7, and the friction ring 48a can also be supported on the hub disc 44. The contact can be maintained by the spring element 12 which can be located on the opposite side, whereby the fingers 14 of the spring element 12 can exert an axial force component.

As shown in FIG. 6b, a simplification has been incorporated into yet another possible embodiment of the present invention. A load friction ring 47a has been provided with preferably an integral, axially extending extension which can be in direct contact against the hub disc 44. Here, too, similar to the embodiment shown in FIG. 6a, the axial contact can be maintained by the spring element 12.

One feature of the invention resides broadly in the clutch disc for motor vehicle friction clutches, comprising a hub with a hub disc for non-rotational fastening on a transmission shaft which defines an axis of rotation, cover plates on both sides of the hub disc which are non-detachably connected to one another and are held at a distance from one another, one of which carries friction linings, spring elements between the hub disc and the cover plates for the relative rotation of the two groups when torque is applied, and a bearing point between one cover plate and the hub to provide elasticity between the two groups, characterized by the fact that a spring element 12 is located on the one cover plate 6, which spring element is realized in the form of a ring-shaped disc and is oriented concentric to the axis of rotation 5, with flexible fingers 13 which extend radially inward and point away from the hub disc 3, 4, which fingers are in contact under bias against a bearing area 15 which is concentric to the axis of rotation 5 and is essentially cylindrical.

Another feature of the invention resides broadly in the clutch disc characterized by the fact that between the cylindrical bearing areas 15, the hub 1, 2 and the flexible fingers 13, there are support elements 16, 17 which are made of material which has a specified coefficient of friction, which specified coefficient of friction can be increased or decreased to suit a particular embodiment of the invention.

Yet another feature of the invention resides broadly in the clutch disc characterized by the fact that the support elements are realized in the form of individual blocks 16, each of which is pressurized essentially radially by a finger 13, and each of which blocks is guided in recesses 18 in the corresponding cover plate 6.

Still another feature of the invention resides broadly in the clutch disc characterized by the fact that as the support element, there is a ring 17 which is rotationally mounted on the hub 2 and on which the fingers 13 of the spring element 12 are supported.

A further feature of the invention resides broadly in the clutch disc characterized by the fact that the ring 17 is provided on its outer contour with recesses 19 which run axially, in which recesses 19 the fingers 13 are non-rotationally engaged.

Another feature of the invention resides broadly in the clutch disc characterized by the fact that the ring 17, peripherally offset from the recesses 19, has slots 20 which are open on the end pinpointing away from the hub disc 3, 4, with a terminal contour 21 which runs at an ascending angle toward the hub disc 3, 4 and on which additional fingers 14 of the spring element 12 are supported, generating an axial retaining force component.

Yet another feature of the invention resides broadly in the clutch disc characterized by the fact that the spring element 12, with the interposition of a plastic ring 22, is non-rotationally connected to the corresponding cover plates 6, in that the plastic ring 22 is engaged by means of axially-oriented lugs 23 in recesses 24 of the cover plate 6 from the side of the hub disc 3, 4, which recesses 24 are open toward the radial inside, and the spring element 12 is inserted by means of its annular disc-shaped portion into a corresponding depression 25 in the plastic ring 22 from the hub disc side, and its fingers 13, 14 also extend through a recess 26 in the plastic ring 22, which recess 26 is open toward the radial inside.

Still another feature of the invention resides broadly in the clutch disc characterized by the fact that the plastic ring 22 is clamped in its radially outer portion between the inside of the cover plate 6 and the hub disc 3, 4 to generate a friction force when there is a relative movement between the cover plate 6 and the hub disc 3, 4.

A further feature of the invention resides broadly in the clutch disc characterized by the fact that a spring 27, 28 is provided, preferably on the side of the hub disc 3, 4 opposite the plastic ring 22, which spring 27, 28 applies pressure to the plastic ring 22 toward the hub disc 3, 4.

Another feature of the invention resides broadly in the clutch disc whereby the hub and hub disc are realized in two parts, with a non-rotational gearing with play or clearance in the peripheral direction between the two parts, and between the hub disc and the cover plate which is provided with the plastic ring and the spring element there is a spring device for the idle range, which spring device has a flat spring characteristic which is effective in the area of the clearance of the gearing between the hub and the hub disc, characterized by the fact that the idle spring device 30 comprises a hub disc 32 which is non-rotationally engaged without peripheral clearance in the axially-extended external gearing 10 of the hub 2, also comprises a cover plate 33 which is located between the hub disc 32 and the plastic ring 22, with axially bent tabs 34 on the outside diameter, which tabs are non-rotationally connected to the hub disc and are supported axially on it, and the cover plate 33 and plastic ring 22 are held in frictional contact by a load friction device between the hub disc 4 and the cover plate 7 at a distance from the idle spring device 30 and which load friction device contains at least one axially acting load spring 28.

Yet another feature of the invention resides broadly in the clutch disc characterized by the fact that radially inside the load friction device 28, 35, 36 there is an additional friction device which consists of a friction ring 37 which is in axial contact with the gearing 10 of the hub 2 and if necessary a friction ring 37 which is non-rotationally connected to the gearing 10, as well as a spring 38 between the friction ring 37 and the cover plate 7.

Still another feature of the invention resides broadly in the clutch disc characterized by the fact that the hub disc 32 of the idle spring device 30 is located axially loosely in the external gearing 10 and between a shoulder of the gearing and a contact contour 39 of the plastic ring 22, which contact contour projects radially inside the cover plate 33 of the idle spring device 30 toward the hub disc 32.

A further feature of the invention resides broadly in the clutch disc characterized by the fact that the axial force components of the spring element 12 and of the spring 38 of the friction device 37, 38 are coordinated so that preferably, an axial gap is maintained between the cover plate 7 and the friction ring 37 or the spring 38 under all operating situations.

Another feature of the invention resides broadly in the clutch disc characterized by the fact that over the radial dimension of the cover plate 33 of the idle spring device 30, starting from an area near the hub, the spring element 12 with the plastic ring 22 and an additional friction device 40, 41 are provided, which friction device comprises a friction ring 40 which is in contact against the inside wall of the cover plate 6, and is engaged by means of axially projecting lugs 42 which are attached to the radial outside in openings 43 and are engaged with play in the hub disc 32 of the idle spring device 30, and a friction spring 41 is located between the friction ring 40 and the cover plate 33 radially inside the lugs 42.

Yet another feature of the invention resides broadly in the clutch disc whereby the hub and hub disc are realized in two parts, with a non-rotational gearing with clearance in the peripheral direction between the two parts, and between the hub disc and the cover plate which is provided with the plastic ring and the spring element there is a spring device for the idle range, which spring device has a flat spring characteristic which is effective in the area of the clearance of the gearing between the hub and the hub disc, characterized by the fact that the idle spring device 30 comprises a hub disc 44 which is engaged non-rotationally without peripheral clearance in the axially elongated external gearing 10 of the hub 2, and is also provided with a cover plate 45 which is located between the hub disc 44 and cover plate 7 of the load spring device 29 and with lugs 46 on the outside diameter which project axially toward the hub disc, which lugs 46 are engaged non-rotationally in the hub disc 4 and are axially supported on it, whereby between the cover plate 45 of the idle spring device 30 and the cover plate 7 of the load spring device 29 there is a load friction ring 47 and between the hub disc 4 and the plastic ring 22 there is an axially acting load spring 28.

Still another feature of the invention resides broadly in the clutch disc characterized by the fact that radially inside the load friction ring 47 there is an additional friction device 48, 49 which consists of a friction ring 48 which is in axial contact with the external gearing 10 of the hub 2 and if necessary is non-rotationally connected to the external gearing 10, as well as a spring 49 between the friction ring 48 and the cover plate 7.

A further feature of the invention resides broadly in the clutch disc characterized by the fact that the hub disc 44 of the idle spring device 30 is located axially loosely in the external gearing 10 of the hub 2 and in particular between a shoulder of the external gearing 10 and a contact contour 50 of the friction ring 48.

Examples of clutch or clutch disc components for a friction clutch of a motor vehicle which clutch or clutch disc components could be adaptable for use in the context of the present invention could be disclosed by the following U.S. patents, each of which have been assigned to the assignee of the present invention: U.S. Pat. No. 5,433,307, No. 5,476,166, No. 5,529,161, No. 5,566,803, No. 5,579,880 and No. 5,579,881.

Additional examples of clutch or clutch disc components for a friction clutch of a motor vehicle which clutch or clutch disc components could be adaptable for use in the context of the present invention could be disclosed by the following U.S. patent applications, each of which have been assigned to the assignee of the present invention: Ser. No. 08/221,372, now U.S. Pat. No. 5476166, Ser. No. 08/360,455, now U.S. Pat. No. 5,613,389, Ser. No. 08/405,139 now U.S. Pat No. 5,582,280, Ser. No. 08/438,709 now U.S. Pat. No. 5,566, 803, Ser. No. 08/499,305 now U.S. Pat. No. 5,662,200, Ser. No. 08/500,197, Ser. No. 08/502,401 now U.S. Pat. No. 5,667,047, No. 504,848 now U.S. Pat. No. 5,669,478, No. 515,263 now U.S. Pat. No. 5,645,151, No. 515,348, Ser. No. 08/518,789 now U.S. Pat. No. 5,711,406, Ser. No. 08/566, 129 now U.S. Pat. No. 5,673,778, and Ser. No. 08/589,025 now U.S. Pat. No. 5,655,634.

Yet additional examples of clutch or clutch disc components for a friction clutch of a motor vehicle which clutch or clutch disc components could be adaptable for use in the context of the present invention could be disclosed by the following U.S. Pats. No. 5,246,399, No. 5,271,487, No. 5,401,213, No. 5,429,220 and No. 5,452,781.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 42 514.6, filed on Nov. 15, 1995, having inventor Norbert Ament, and DE-OS 195 42 514.6 and DE-PS 195 42 514.6, as well as their published equivalents, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a friction clutch for a motor vehicle, said clutch disc comprising:

said hub;

said hub being configured to be attached to a shaft of a motor vehicle transmission;

said hub being configured to rotate about an axis of rotation;

friction linings;

said friction linings being disposed about said hub;

a hub disc;

said hub disc being disposed about said hub;

a cover plate;

a ring-shaped member;

said ring-shaped member being configured and disposed to position said cover plate substantially concentrically about said hub;

a plurality of fingers extending from said ring-shaped member;

said plurality of fingers being disposed to mount said ring-shaped member on said hub;

each one of said plurality of fingers extending towards said hub;

each one of said plurality of fingers also extending away from said hub disc in a direction defined substantially parallel to the axis of rotation;

each one of said plurality of fingers being configured and disposed to urge said ring-shaped member to be positioned substantially concentrically about said hub;

said ring-shaped member being non-rotatably connected to said cover plate;

said ring-shaped member being rotatably mounted on said hub;

said cover plate having limited rotational play in relation to said hub disc;

said limited rotational play comprising a relative rotation of said cover plate with respect to said hub disc about the axis of rotation;

said clutch disc further comprising a friction device disposed to dissipate energy during a relative rotation of said cover plate with respect to said hub disc;

said friction device comprising a component disposed about said hub;

said component of said friction device comprising an annular depression extending substantially concentrically about the axis of rotation; and said ring-shaped member being disposed within said annular depression.

2. The clutch disc according to claim 1, wherein:

said ring-shaped member of said clutch disc and said plurality of fingers are a first member of said clutch disc;

said clutch disc further comprises a second member;

said second member is disposed between each one of said plurality of fingers and said hub; and said second member is disposed to transfer a force between each one of said plurality of fingers and said hub.

3. The clutch disc according to claim 2, wherein:

the axis of rotation defines an axial direction substantially parallel to the axis of rotation;

said cover plate has limited rotational play in relation to said hub;

said limited rotational play in relation to said hub comprises relative rotation of said cover plate with respect to said hub about the axis of rotation;

said friction device is a first friction device;

said clutch disc comprises a second friction device configured and disposed to dissipate energy during relative rotation of said cover plate with said hub;

said second member of said clutch disc is a component of said second friction device;

said component of said second friction device comprises a plurality of bodies;

each one of said plurality of bodies is disposed between said hub and a corresponding one of said plurality of fingers of said first member;

each one of said plurality of bodies is rotatably mounted on said hub;

said cover plate comprises a first side and an axially opposite second side;

said cover plate comprises a surface disposed adjacent said hub;

said cover plate comprises a plurality of recesses;

each one of said plurality of recesses extends outwardly from said surface of said cover plate;

each one of said plurality of recesses extends between said first and second sides of said cover plate;

each one of said plurality of bodies is disposed within a corresponding one of said plurality of recesses to non-rotatably connect each one of said plurality of bodies and said cover plate with one another;

said cover plate is a first cover plate;

said clutch disc comprises a second cover plate disposed about said hub;

said hub disc is disposed between said first and second cover plates;

said first and second cover plates are fixedly attached to one another;

said friction linings are attached to one of: said first and second cover plates;

said first friction device comprises a spring;

said spring is disposed between said first and second cover plates;

said spring is configured and disposed to apply an axially directed force to said component of said first friction device to urge said component against said first cover plate;

said component of said first friction device is ring-shaped;

said ring-shaped component comprises plastic;

said first member comprises sheet steel;

said clutch disc comprises at least one second spring disposed between said hub disc and at least one of said first and second cover plates; and said at least one second spring is configured and disposed to store and release energy during relative rotation of said first plate with respect to said hub disc.

4. The clutch disc according to claim 2, wherein:

said second member is cylinder-shaped; and said cylinder-shaped second member is rotatably mounted upon said hub.

5. The clutch disc according to claim 4, wherein:

said second member comprises a plurality of grooves;

each one of said plurality of grooves extends substantially parallel to the axis of rotation; and each one of said plurality of fingers of said first member extends into a corresponding one of said plurality of grooves of said second member to non-rotatably connect said first and second members with one another.

6. The clutch disc according to claim 5, wherein:

the axis of rotation defines an axial direction substantially parallel to the axis of rotation;

said second member comprises an inner surface disposed adjacent said hub;

said second member comprises an outer surface disposed about said inner surface of said second member;

said second member comprises a first side and an axially opposite second side;

said second side of said second member is disposed between said hub disc and said first side of said second member;

said plurality of fingers of said first member is a plurality of first fingers of said first member;

said first member comprises at least one second finger;

said at least one second finger is disposed between two immediately adjacent ones of said plurality of first fingers;

said at least one second finger extends from said first member towards said hub and away from said hub disc;

said at least one second finger is disposed substantially transverse to the axis of rotation;

said second member comprises at least one slot;

said at least one slot extends between said inner and outer surfaces of said second member;

said second member comprises at least one end surface disposed between said first and second sides of said second member;

said at least one slot extends between said first side of said second member and said at least one end surface of said second member;

said at least one end surface of said second member is disposed substantially parallel with said at least one second finger of said first member;

said at least one second finger of said first member extends into said at least one slot of said second member; and said at least one second finger of said first member is configured and disposed to apply a force to said at least one end surface of said second member to urge said second member towards said hub disc.

7. The clutch disc according to claim 6, wherein:

said cover plate comprises a first side and an axially opposite second side;

said cover plate comprises a surface disposed adjacent said hub;

said cover plate comprises a plurality of first recesses;

each one of said plurality of first recesses extends outwardly from said surface of said cover plate;

each one of said plurality of first recesses extends between said first and second sides of said cover plate;

said component of said friction device is ring-shaped;

said ring-shaped component comprises a first side and an axially opposite second side;

said second side of said ring-shaped component is disposed between said first side of said ring-shaped component and said hub disc;

said annular depression of said ring-shaped component is disposed on said second side of said ring-shaped component;

said ring-shaped component comprises a plurality of projections extending from said first side of said ring-shaped component towards said cover plate;

each one of said plurality of projections extends into a corresponding one of said plurality of first recesses of said cover plate to non-rotatably connect said ring-shaped component and said cover plate to one another;

said ring-shaped component comprises a surface disposed adjacent said hub;

said ring-shaped component comprises a plurality of second recesses;

each one of said plurality of second recesses extends away from said surface of said ring-shaped component;

each one of said plurality of second recesses extends between said first and second sides of said ring-shaped component; and said at least one second finger of said ring-shaped first member and each one of said plurality of first fingers of said ring-shaped first member extends through a corresponding one of said plurality of second recesses of said ring-shaped component to non-rotatably connect said ring-shaped first member and said ring-shaped component to one another.

8. The clutch disc according to claim 7, wherein:

said cover plate is a first cover plate of said clutch disc;

said clutch disc comprises a second cover plate disposed about said hub;

said hub disc is disposed between said first and second cover plates;

said first and second cover plates are non-rotatably connected to one another;

said friction device comprises a spring;

said spring is disposed between said hub disc and one of: said first cover plate and said second cover plate; and said spring is configured and disposed to urge said ring-shaped component towards one of: said hub disc and said first cover plate.

9. The clutch disc according to claim 8, wherein:

said cover plate has limited rotational play in relation to said hub;

said limited rotational play in relation to said hub comprises relative rotation of said cover plate with respect to said hub about the axis of rotation;

said hub disc is a first hub disc;

said first hub disc has limited rotational play in relation to said hub;

said limited rotational play of said first hub disc comprises relative rotation of said first hub disc with respect to said hub about the axis of rotation;

said clutch disc comprises a second hub disc disposed about said hub;

said second hub disc is non-rotatably connected to said hub;

said second hub disc is disposed between said first hub disc and one of: said first cover plate and said second cover plate;

said clutch disc comprises a third cover plate disposed about said hub;

said third cover plate is disposed between said second hub disc and said one of: said first cover plate and said second cover plate;

said third cover plate is non-rotatably connected to said first hub disc; and said spring is configured and disposed to urge said ring-shaped component towards said first cover plate.

10. The clutch disc according to claim 9, wherein:

said second hub disc is disposed between said first hub disc and said first cover plate;

said third cover plate is disposed between said second hub disc and said first cover plate;

said ring-shaped component of said friction device is a first ring-shaped component;

said friction device comprises a second ring-shaped component disposed about said hub;

said second ring-shaped component is disposed between said first hub disc and said second cover plate;

said second ring-shaped component is non-rotatably connected to said first hub disc;

said friction device comprises a third ring-shaped component disposed about said hub;

said third ring-shaped component is disposed between said second ring-shaped component and said second cover plate;

said spring is disposed between said first hub disc and said second ring-shaped component;

said spring is further configured and disposed to urge said third ring-shaped component against said second cover plate and to urge said first ring-shaped component against said first cover plate;

said hub comprises a portion extending outwardly from the remainder of said hub;

said hub portion extends away from the axis of rotation from the remainder of said hub;

said hub portion comprises a first side and an axially opposite second side;

said second side of said hub portion is disposed between said first side of said hub portion and said second cover plate;

said friction device is a first friction device;

said clutch disc further comprises a second friction device;

said second friction device is disposed to dissipate energy during at least a portion of relative rotation of said first cover plate with respect to said hub;

said second friction device comprises a fourth ring-shaped component disposed about said hub;

said fourth ring-shaped component is disposed adjacent said second side of said hub portion;

said spring of said first friction device is a first spring;

said second friction device comprises a second spring;

said second spring is disposed between said fourth ring-shaped second component and said second cover plate; and said second spring is configured and disposed to urge said fourth ring-shaped component against said second side of said hub portion.

11. The clutch disc according to claim 10, wherein:

said third cover plate comprises a first side and an axially opposite second side;

said third cover plate comprises at least one opening;

said at least one opening extends between said first and second sides of said third cover plate;

said plurality of projections of said first ring-shaped component is a plurality of first projections of said ring-shaped first component;

said first ring-shaped component comprises at least one second projection;

said at least one second projection extends from said second side of said ring-shaped first component towards said second cover plate;

said at least one second projection extends through said at least one opening of said third cover plate;

said hub portion comprises a first segment and a second segment;

said first segment of said hub portion extends from said first side of said hub portion towards said second side of said hub portion;

said second segment of said hub portion extends from said first segment towards said second side of said hub portion;

said second hub disc is disposed about said first segment of said hub portion;

said second hub disc is axially movable along said first segment of said hub portion;

said at least one second projection of said first ring-shaped component is configured and disposed to limit movement of said second hub disc towards said first cover plate; and said second segment of said hub portion is configured and disposed to limit movement of said second hub disc towards said second cover plate.

12. The clutch disc according to claim 11, wherein:

at least one of: said second ring-shaped component and said second spring are separated by a distance from said second cover plate, the distance being defined substantially parallel to the axis of rotation; and said at least one second finger of said first ring-shaped member and said second spring of said second friction device are both configured and disposed to maintain separation of said second cover plate and said at least one of: said second ring-shaped component and said second spring.

13. The clutch disc according to claim 12, wherein:

said clutch disc comprises a third friction device configured and disposed to dissipate energy during relative rotation between said first cover plate and said first hub disc;

said third friction device comprises a fifth ring-shaped component disposed about said hub;

said fifth ring-shaped component is disposed between said first cover plate and said third cover plate;

said third friction device comprises a third spring;

said third spring is disposed between said fifth ring-shaped component and said third cover plate;

said third spring is configured and disposed to urge said fifth ring-shaped component against said first cover plate;

said second hub disc comprises a first side and an axially opposite second side;

said second hub disc comprises at least one opening extending between said first and second sides of said second hub disc;

said fifth ring-shaped component comprises at least one third projection;

said at least one third projection extends from said fifth ring-shaped component and is disposed in said at least one opening of said second hub disc;

both of said at least one third projection and said at least one opening of said second hub disc are configured and disposed to permit relative rotational play between said fifth ring-shaped component and said second hub disc;

said third spring is disposed nearer to the axis of rotation than said at least one third projection;

said first and second cover plates are fixedly connected to one another;

said friction linings are attached to one of said first and second cover plates;

said first ring-shaped member comprises sheet steel;

said first ring-shaped component comprises plastic;

said clutch disc comprises at least one fourth spring connected between said first hub disc and at least one of said first and second cover plates;

said at least one fourth spring is configured and disposed to store and release energy during relative rotation of said first cover plate with respect to said first hub disc;

said clutch disc comprises at least one fifth spring connected between said second hub disc and said third cover plate;

said at least one fifth spring is configured and disposed to store and release energy during relative rotation of said first hub disc with respect to said hub;

said at least one fifth spring comprises a substantially flat spring characteristic curve;

said first hub disc comprises a toothed portion;

said hub portion comprises a toothed portion;

said toothed portion of said first hub disc engages said toothed portion of said hub portion to permit limited rotational play between said first hub disc and said hub;

said second hub disc comprises a toothed portion;

said toothed portion of said second hub disc engages said toothed portion of said hub portion to non-rotatably connect said second hub disc and said hub;

said third cover plate comprises an outer periphery;

said third cover plate comprises at least one flap extending substantially axially from the outer periphery of said third cover plate;

said at least one flap extends from said third cover plate to said first hub disc;

each of said at least one flap and said first hub disc are configured and disposed to non-rotatably connect said third cover plate and said first hub disc to one another; and each of said at least one flap and said first hub disc comprises means for limiting axial movement of said third cover plate towards said first hub disc.

14. The clutch disc according to claim 9, wherein:

said second hub disc is disposed between said first hub disc and said second cover plate;

said third cover plate is disposed between said second hub disc and said second cover plate;

said ring-shaped component of said friction device is a first ring-shaped component;

said friction device comprises a second ring-shaped component;

said second ring-shaped component is disposed between said third cover plate and said second cover plate;

said spring of said friction device is disposed between said first hub disc and said first ring-shaped component; and said spring of said friction device is further configured and disposed to urge said second ring-shaped component against said second cover plate and to urge said first ring-shaped component against said first cover plate.

15. The clutch disc according to claim 14, wherein:

said friction device is a first friction device;

said spring of said first friction device is a first spring;

said hub comprises a portion extending outwardly from the remainder of said hub;

said hub portion extends away from the axis of rotation from the remainder of said hub;

said hub portion comprises a first side and an axially opposite second side;

said second side of said hub portion is disposed between said first side of said hub portion and said second cover plate;

said clutch disc comprises a second friction device to dissipate energy during at least a portion of relative rotation between said first cover plate and said hub;

said second friction device comprises a third ring-shaped component disposed about said hub;

said third ring-shaped component is disposed adjacent said second side of said hub portion;

said second friction device comprises a second spring;

said second spring is disposed between said third ring-shaped third component and said second cover plate; and said second spring is configured and disposed to urge said second ring-shaped component against said second side of said hub portion.

16. The clutch disc according to claim 15, wherein:

said hub portion comprises a first segment and a second segment;

said second segment of said hub portion extends from said second side of said hub portion towards said first side of said hub portion;

said first segment of said hub portion extends from said second segment of said hub portion towards said first side of said hub portion;

said second hub disc is disposed about said second segment of said hub portion;

said second hub disc is axially movable along said second segment of said hub portion;

said third ring-shaped component comprises at least one third projection;

said at least one third projection extends from said third ring-shaped component towards said first cover plate;

said first segment of said hub portion is configured and disposed to limit axial movement of said second hub disc towards said first cover plate;

said at least one third projection is configured and disposed to limit axial movement of said second hub disc towards said second cover plate;

said first and second cover plates are fixedly connected to one another;

said friction linings are attached to one of said first and second cover plates;

said first ring-shaped member comprises sheet steel;

said first ring-shaped component comprises plastic;

said clutch disc comprises at least one third spring connected between said first hub disc and at least one of said first and second cover plates;

said at least one third spring is configured and disposed to store and release energy during relative rotation of said first cover plate with respect to said first hub disc;

said clutch disc comprises at least one fourth spring connected between said second hub disc and said third cover plate;

said at least one fourth spring is configured and disposed to store and release energy during relative rotation of said first hub disc with respect to said hub;

said at least one fourth spring comprises a substantially flat spring characteristic curve;

said first hub disc comprises a toothed portion;

said hub portion comprises a toothed portion;

said toothed portion of said first hub disc engages said toothed portion of said hub portion to permit limited rotational play between said first hub disc and said hub;

said second hub disc comprises a toothed portion;

said toothed portion of said second hub disc engages said toothed portion of said hub portion to non-rotatably connect said second hub disc and said hub;

said third cover plate comprises an outer portion;

said third cover plate comprises at least one flap extending substantially axially from said outer portion of said third cover plate;

said at least one flap extends from said third cover plate to said first hub disc;

each of said at least one flap and said first hub disc are configured and disposed to non-rotatably connect said third cover plate and said first hub disc to one another; and each of said at least one flap and said first hub disc comprises means for limiting axial movement of said third cover plate towards said first hub disc.

17. A friction clutch for a motor vehicle, said friction clutch comprising:

a pressure plate;

a clutch disc configured to be engageable between said pressure plate and a flywheel of a motor vehicle; and said clutch disc comprising:

a hub;

said hub being configured to be attached to a shaft of a motor vehicle transmission;

said hub being configured to rotate about an axis of rotation;

friction linings;

said friction linings being disposed about said hub;

a hub disc;

said hub disc being disposed about said hub;

a cover plate;

a ring-shaped member;

said ring-shaped member being configured and disposed to position and dispose said cover plate substantially concentrically about said hub;

a plurality of fingers extending from said ring-shaped member;

said plurality of fingers being disposed to mount said ring-shaped member on said hub;

each one of said plurality of fingers extending towards said hub;

each one of said plurality of fingers also extending away from said hub disc in a direction defined substantially parallel to the axis of rotation;

each one of said plurality of fingers being configured and disposed to urge said ring-shaped member to be positioned and disposed substantially concentrically about said hub;

said ring-shaped member being non-rotatably connected to said cover plate;

said ring-shaped member being rotatably mounted on said hub;

said cover plate having limited rotational play in relation to said hub disc;

said limited rotational play comprising a relative rotation of said cover plate with respect to said hub disc about the axis of rotation;

a friction device disposed to dissipate energy during a relative rotation of said cover plate with respect to said hub disc;

said friction device comprising a component disposed about said hub;

said component of said friction device comprising an annular depression extending substantially concentrically about the axis of rotation;

said ring-shaped member being disposed within said annular depression;

said friction device comprising a first spring configured and disposed to apply an axially directed force to said component to urge said component against said cover plate;

said cover plate being a first cover plate of said clutch disc;

said clutch disc further comprising a second cover plate;

said first and second cover plates being fixedly connected to one another;

said friction linings being disposed on one of said first and second cover plates;

said clutch disc comprising at least one second spring connected between said hub disc and one of said first and second cover plates;

said second spring being configured and disposed to store and release energy during relative rotation between said first cover plate and said hub disc;

said component of said friction device comprising plastic; and said ring-shaped member comprising sheet steel.

* * * * *

UNITED STATES PATENT AND TRADEMARK OFFICE
CERTIFICATE OF CORRECTION

PATENT NO. : 5,829,567
DATED : November 3, 1998
INVENTOR(S) : Norbert AMENT

It is certified that error appears in the above-identified patent and that said Letters Patent is hereby corrected as shown below:

On the Title Page, [56], under Attorney, Agent, or Firm section, after 'H.', delete "Lijungman" and insert --Ljungman--.

In column 6, line 35, after 'section', delete "4a-3a" and insert --4a-4a--.

In column 6, line 51, after 'illustrated', delete "in;" and insert --in FIG. 6;--.

In column 13, line 46, after 'end', delete "pinpointing" and insert --pointing--.

Signed and Sealed this

Twentieth Day of July, 1999

Attest:

Q. TODD DICKINSON

*Attesting Officer*       *Acting Commissioner of Patents and Trademarks*